United States Patent
Bassani et al.

(10) Patent No.: US 10,824,413 B2
(45) Date of Patent: Nov. 3, 2020

(54) MAINTENANCE OF COMPUTING NODES CONCURRENTLY IN A NUMBER UPDATED DYNAMICALLY

(71) Applicant: International Business Machines Corporation, Armonk, NY (US)

(72) Inventors: Damiano Bassani, Rome (IT); Antonio Di Cocco, Rome (IT); Pasquale Maria Mascolo Montenero, Barletta (IT); Paolo Ottaviano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/042,429

(22) Filed: Jul. 23, 2018

(65) Prior Publication Data
US 2020/0026507 A1 Jan. 23, 2020

(51) Int. Cl.
*G06F 8/65* (2018.01)
*G06F 11/30* (2006.01)

(52) U.S. Cl.
CPC ............ *G06F 8/65* (2013.01); *G06F 11/3006* (2013.01); *G06F 11/3055* (2013.01)

(58) Field of Classification Search
CPC ..... G06F 8/65; G06F 11/3006; G06F 11/3055
USPC .......................................................... 717/171
See application file for complete search history.

(56) References Cited

U.S. PATENT DOCUMENTS

| 7,130,897 B2 | 10/2006 | Dervin et al. |
| 9,032,053 B2 | 5/2015 | Kosuru et al. |
| 9,141,487 B2 | 9/2015 | Jagtiani et al. |
| 9,286,052 B1 | 3/2016 | Solan et al. |
| 9,465,602 B2 | 10/2016 | Calder et al. |
| 2006/0265630 A1* | 11/2006 | Alberti ...................... G06F 8/65 714/38.12 |
| 2007/0033635 A1* | 2/2007 | Hirsave ................ G06F 21/577 726/1 |

(Continued)

FOREIGN PATENT DOCUMENTS

| CN | 101741894 A | 6/2010 |
| CN | 105005487 A | 10/2015 |

(Continued)

OTHER PUBLICATIONS

Anonymous, "Method for reducing downtime during the upgrade of a system or appliance," IP.com Prior Art Database Technical Disclosure, IP.com No. IPCOM000222595D, Oct. 18, 2012, pp. 1-4. https://ip.com/IPCOM/000222595.

(Continued)

*Primary Examiner* — Ryan D. Coyer
(74) *Attorney, Agent, or Firm* — Nathan M. Rau

(57) ABSTRACT

A method for maintaining a computing system comprising a plurality of computing nodes is disclosed. The method comprises causing an application of a maintenance activity concurrently on a maintenance subset of the computing nodes not exceeding a limit number, monitoring one or more status indicators of the computing system during the application of the maintenance activity and updating the limit number according to the status indicators. A computer program and a computer program product for performing the method are also disclosed. Moreover, a corresponding control computing machine is disclosed.

20 Claims, 7 Drawing Sheets

(56) References Cited

U.S. PATENT DOCUMENTS

| | | | | |
|---|---|---|---|---|
| 2013/0007265 A1* | 1/2013 | Benedetti | ............ | H04L 67/1097 |
| | | | | 709/224 |
| 2014/0229939 A1* | 8/2014 | Dias de Assuncao | .... | G06F 8/63 |
| | | | | 718/1 |
| 2015/0106504 A1* | 4/2015 | Astigarraga | ............ | H04L 43/16 |
| | | | | 709/224 |
| 2015/0169291 A1* | 6/2015 | Dube | ......................... | G06F 8/20 |
| | | | | 717/101 |
| 2015/0262106 A1* | 9/2015 | Diao | ................ | G06Q 10/06375 |
| | | | | 705/7.37 |
| 2015/0378701 A1* | 12/2015 | Cai | .......................... | G06F 8/60 |
| | | | | 717/168 |
| 2016/0321319 A1 | 11/2016 | Noonen et al. | | |
| 2017/0064009 A1* | 3/2017 | Baltar | ................... | H04L 67/148 |
| 2017/0115978 A1 | 4/2017 | Modi et al. | | |

FOREIGN PATENT DOCUMENTS

| | | |
|---|---|---|
| CN | 106354531 A | 1/2017 |
| WO | 2016180156 A1 | 11/2016 |

OTHER PUBLICATIONS

Neamtiu et al., "Cloud Software Upgrades: Challenges and Opportunities," 2011 International Workshop on the Maintenance and Evolution of Service-Oriented and Cloud-Based Systems (MESOCA), Sep. 2011, pp. 1-10. DOI: 10.1109/MESOCA.2011.6049037.
International Search Report and Written Opinion dated Nov. 27, 2019 for Application PCT/IB2019/055486, 9 pgs.

\* cited by examiner

MAINTENANCE OF COMPUTING NODES CONCURRENTLY IN A NUMBER UPDATED DYNAMICALLY

BACKGROUND

The present disclosure relates to the information technology field. More specifically, this disclosure relates to the maintenance of a computing system.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Every computing system is generally subject to maintenance activities over time; for example, maintenance activities are routinely applied to software programs running on the computing system, such as to install patches for correcting bugs, to upgrade the software programs for improving their operation or adding new functionalities.

The application of the maintenance activities may adversely affect operation of the computing system. Indeed, the software programs are unavailable during the application of the maintenance activities thereon (or at least during part thereof). In any case, the maintenance activities slow down operation of the computing system (and then of any other software programs running thereon). Moreover, the maintenance activities may require putting off-line the computing system (for example, when a re-booting thereof is needed to make the maintenance activities effective).

A particular scenario is when the computing system comprises a plurality of computing nodes contributing to its operation (acting as a single logical entity providing services in response to corresponding requests submitted thereto from the outside). For example, the computing nodes may be organized in a cluster architecture, wherein the computing system automatically assigns the requests to the computing nodes (all performing the same tasks) that are best suited to their handling. This provides parallel processing and/or high availability of the computing system. A typical example is when the computing system is of the cloud type. In this case, cloud services are provided to corresponding users by cloud providers, which provision, configure and release corresponding computing resources upon request (with their actual implementation that is completely opaque to the users). This de-coupling of the cloud services from their implementation provides the illusion of an infinite capacity of the corresponding computing resources and improves their exploitation, especially for high-peak load conditions (by means of economies of scale); moreover, the users are now relived of the management of the computing resources, and they may perform tasks (on a pay-per-use basis) that were not feasible previously because of their cost and complexity (especially for individuals and small companies).

In the above-mentioned computing system based on computing nodes, every maintenance activity may be applied concurrently to subsets of the computing nodes in succession. In this way, the computing system stays on-line during the maintenance activity (with the requests submitted thereto that are handled by the computing nodes that remain available).

However, the reduced number of computing nodes that are available may cause a degradation of performance of the computing system; in the worst cases, the performance of the computing system may be so low that it appears as completely unavailable from the outside. This may be unacceptable in several situations. A typical example is when a predefined service level is required to the cloud services that are provided by the computing system of the cloud type; the service level may be defined in a Service Level Agreement (SLA) that has been negotiated between each user and the corresponding cloud provider, in terms of one or more target metrics to be met by the cloud services (such as a maximum response time).

Moreover, the application of the maintenance activity progressively to the computing nodes increases the time required to apply it to the whole computing system. This increases the time during which the computing system (i.e., the different instances of the same software program installed on its computing nodes) is not consistently up-to-date.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of updating a number of the computing nodes to be maintained concurrently in a dynamic way.

Particularly, an aspect provides a method for maintaining a computing system comprising a plurality of computing nodes. The method comprises causing an application of a maintenance activity concurrently on a maintenance subset of the computing nodes not exceeding a limit number, monitoring one or more status indicators of the computing system during the application of the maintenance activity and updating the limit number according to the status indicators.

A further aspect provides a computer program for implementing the method.

A further aspect provides a computer program product for implementing the method.

A further aspect provides a corresponding system.

A further aspect provides a corresponding control computing machine.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

One way that some embodiments of the present invention may represent a technological improvement is that it provides for monitoring, and providing remedial actions for, a cloud infrastructure in a cognitive way changing in real time the parameters that outline the status of a virtual environment. Some embodiments of the present disclosure may represent a specific improvement in computer capabilities, and not an idea where computers are invoked merely as a tool because the system learns actively and constantly as an artificial intelligence, in order to safely update each parameter to ensure optimal operation.

Figure 1:
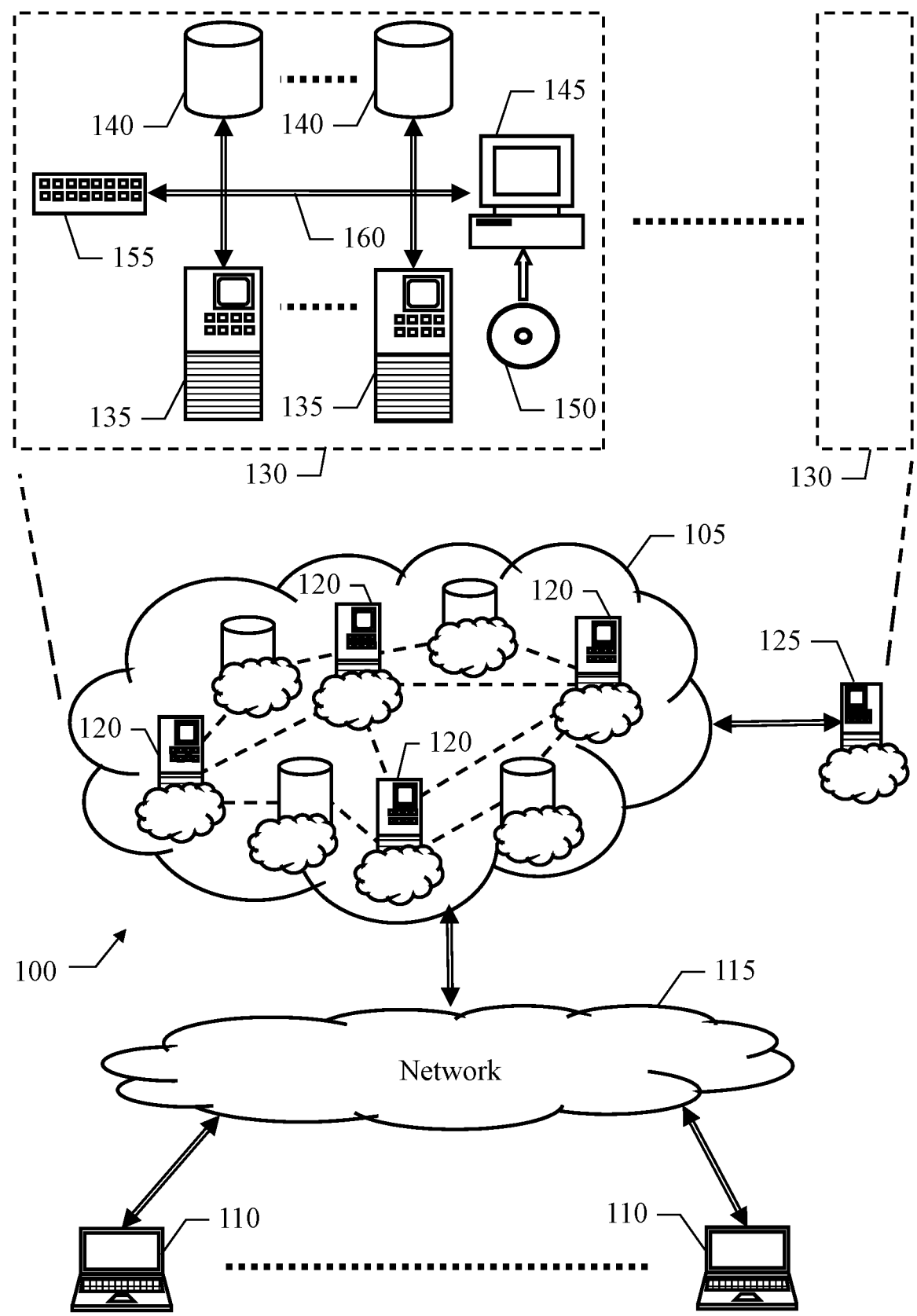
FIG. 1 shows a schematic block diagram of a computing infrastructure according to an embodiment of the present disclosure may be practiced.

With reference in particular to FIG. 1, a schematic block diagram is shown of a computing infrastructure 100 according to an illustrative embodiment of the present disclosure may be practiced.

The computing infrastructure 100 comprises one or more cloud providers 105 (only one shown in the figure). Each cloud provider 105 is an entity that provides a pool of computing resources as cloud services (i.e., shared computing resources that may be provisioned, configured and released very rapidly); the computing resources of the cloud services (generally of the virtual type, i.e., emulations by software of physical computing resources) are provided upon request to users of the cloud provider 105, so that each user has the sole control of these computing resources (which may then be used exactly as if they were dedicated physical computing resources). The cloud services may be provided according to several service models, particularly, Infrastructure as a Service, or IaaS (providing computing resources with corresponding storage and management software, such as virtual machines, virtual disks with firewalls, load balancers), Platform as a Service, or PaaS (providing software platforms, such as databases, web servers), Software As a Service, or SaaS (providing software applications, such as CADs, office suites), and Network as a Service, or NaaS (providing connectivity services, such as VPNs, IP addresses). Moreover, the cloud services may be provided according to different deployment models, particularly, public cloud (i.e., for the general public), private cloud (i.e., for a single organization), community cloud (i.e., for several organizations) or hybrid cloud (based on a combination of different deployment models).

The users connect to the cloud provider 105 with corresponding client computing machines, or simply clients, 110 (for example, of the thin type) via a (communication) network 115; for example, the network 115 may be the Internet for a public/community cloud or a LAN for a private cloud. For this purpose, the cloud provider 105 exposes a front-end component for accessing it (for example, via a web browser of the clients 110); the front-end component interfaces with a back-end component actually implementing the cloud services (which back-end component is not accessible from the outside, so that the users are completely agnostic about its location and configuration).

The cloud services are provided by a cluster (or more) of computing nodes 120, for example, virtual machines (acting as a single logical entity with all the computing nodes 120 that perform the same tasks). In the solution according to an embodiment of the present disclosure, the cloud provider 105 further comprises a control computing machine, or simply control machine, 125 (for example, another virtual machine), which controls the maintenance of the computing nodes 120.

The computing nodes 120 and the control machine 125 are implemented by a computing system of the cloud provider 105 formed by one or more server farms 130. Each server farm 130 comprises several server computing machines, or simply servers, 135 (for example, of the rack or blade type) and storage disks 140 (for example, of the RAID type) implementing mass-memories thereof; in turn, each server 135 comprises one or more microprocessors ($\mu$P) controlling its operation, a non-volatile memory (ROM) storing basic code for a bootstrap thereof and a volatile memory (RAM) used as a working memory by the microprocessors (not shown in the figure). The server farm 130 also comprises a console 145 for controlling it (for example, a personal computer, also provided with a drive for reading/writing removable storage units 150, such as optical disks like DVDs). A switch/router sub-system 155 manages any communications among the servers 135, the disks 140 and the console 145, and with the network 115; for this purpose, the servers 135, the disks 140 and the console 145 are connected to the switch/router sub-system 155 (through corresponding network adapters) via a cabling sub-system 160.

With reference now to FIG. 2A-FIG. 2D, the general principles are shown according to an illustrative embodiment of the present disclosure.

Figure 2A:
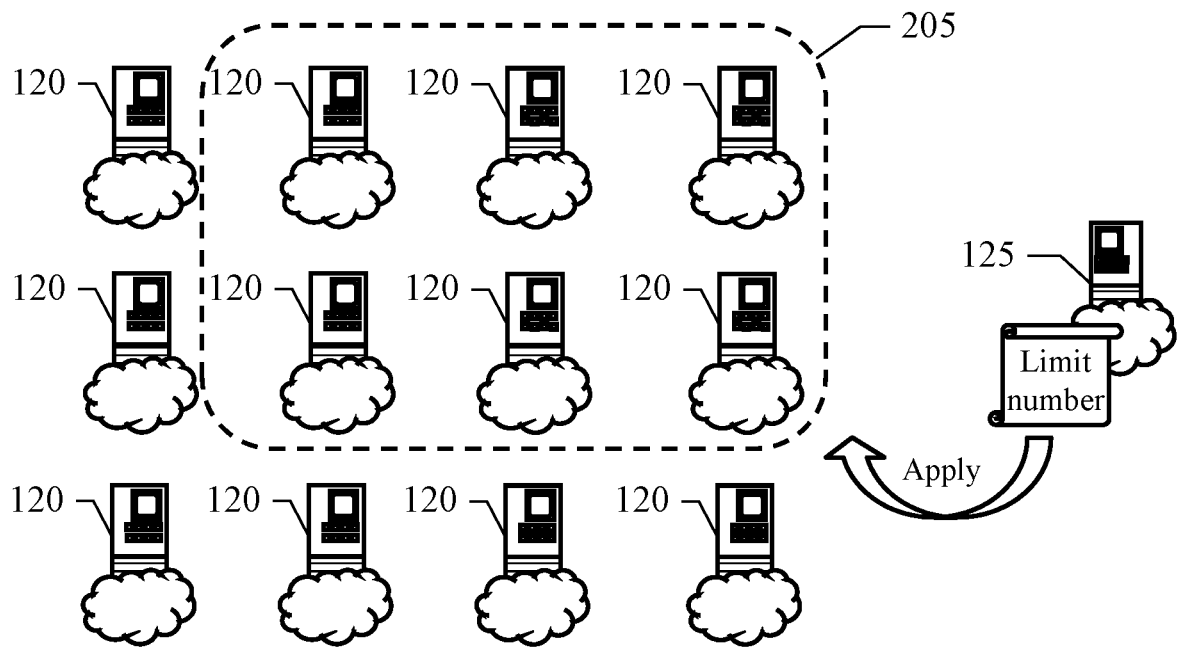
FIG. 2A-FIG. 2D show the general principles according to an embodiment of the present disclosure.

Starting from FIG. 2A, a maintenance activity is to be applied on the computing nodes 120 (for example, to patch or upgrade corresponding instances of a same software program installed thereon). The maintenance activity is applied concurrently to (maintenance) subsets of the computing nodes 120 in succession. For this purpose, at the beginning a limit number of the computing nodes 120 (to which the maintenance activity may be applied concurrently at most) in initialized to a pre-defined value. The maintenance activity is then applied concurrently (by the control machine 125) on a (current) maintenance subset 205 of the computing nodes 120; the maintenance subset 205 has a cardinality that does not exceed the limit number (i.e., equal thereto as far as possible).

Figure 2B:
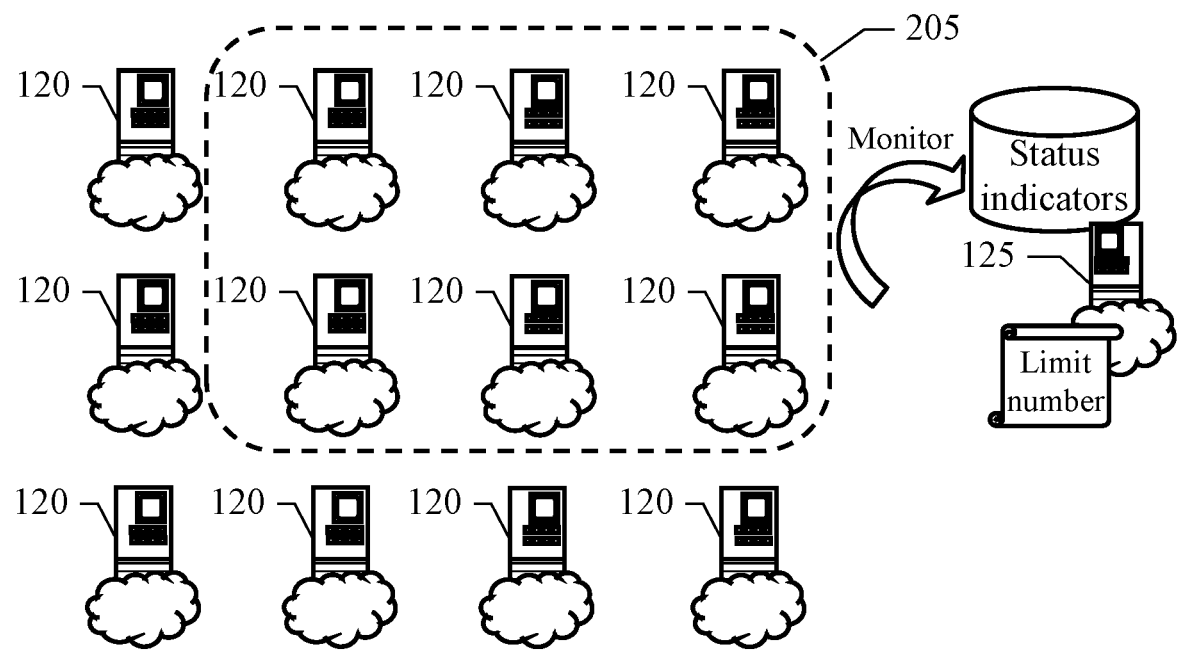

Moving to FIG. 2B, according to an embodiment of the present disclosure one or more status indicators are monitored. The status indicators are indicative of a status of the computing system of the cloud provider (wherein the computing nodes 120 are implemented) during the application of the maintenance activity; for example, the status indicators represent the performance of the computing system in terms of its computing nodes 120, software programs running on the computing nodes 120 and system infrastructures of the computing system.

Figure 2C:
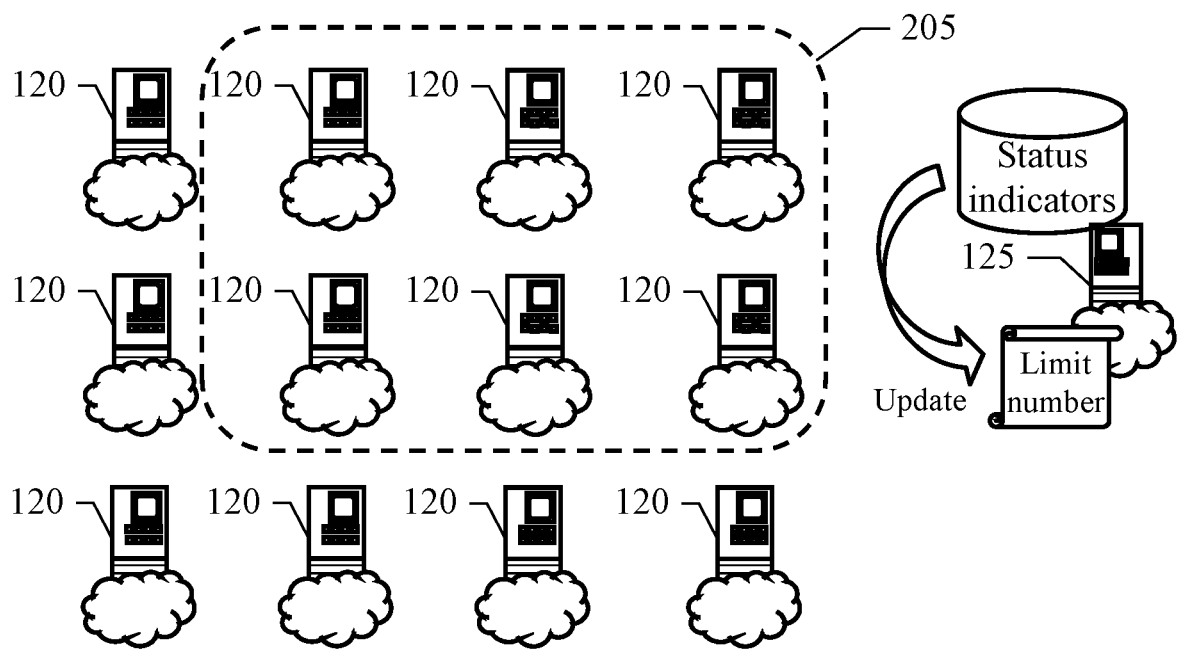

Moving to FIG. 2C, the limit number is updated according to the status indicators. For example, the limit number is increased as far as possible when the status indicators represent that the performance of the computing system is as desired, and it is decreased when the status indicators represent that the performance of the computing system is too low.

Figure 2D:
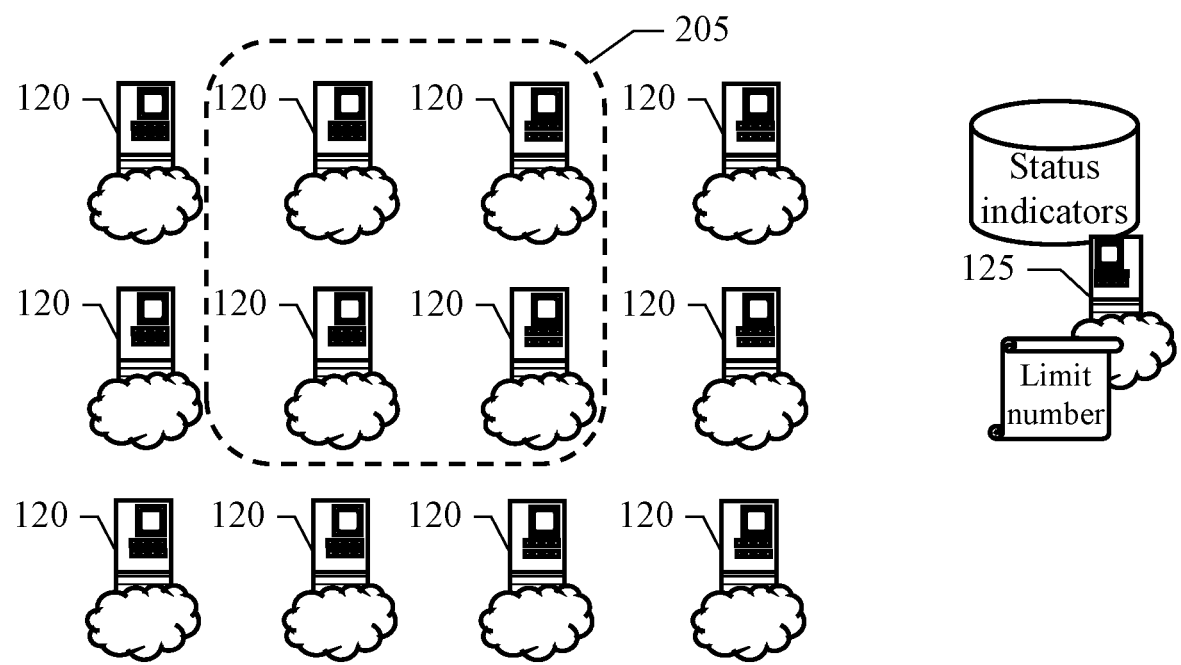

Moving to FIG. 2D, the maintenance subset 205 is updated so that its cardinality does not exceed the (updated) limit number. For example, when the limit number has been decreased the maintenance activity is not applied to any further computing node 120 until the cardinality of the maintenance subset 205 has reached the limit number following a completion of the maintenance activity on one or more computing nodes 120 (as shown in the figure); conversely, when the limit number has been increased the maintenance activity is applied to one or more further computing nodes 120, until the cardinality of the maintenance subset 205 has reached the limit number as far as possible (not shown in the figure).

The same operations are repeated continually until the maintenance activity has been applied to all of the computing nodes 120.

In this way, the number of computing nodes 120 on which the maintenance activity is applied concurrently self-adapts to the status of the computing system dynamically.

Particularly, the number of computing nodes 120 that remain available ensures an acceptable level of performance of the computing system (avoiding downtimes thereof as far as possible). Particularly, in this way it is possible to maintain a service level of the computing system required by any applicable SLA (such as its maximum response time).

At the same time, the time required to apply the maintenance activity to the whole computing system (and then the time during which the different instances of the same software program are not consistently up-to-date) decreases.

As a result, the application of the maintenance activity to the computing system is as fast as possible without significantly affecting its operation.

Figure 3A:
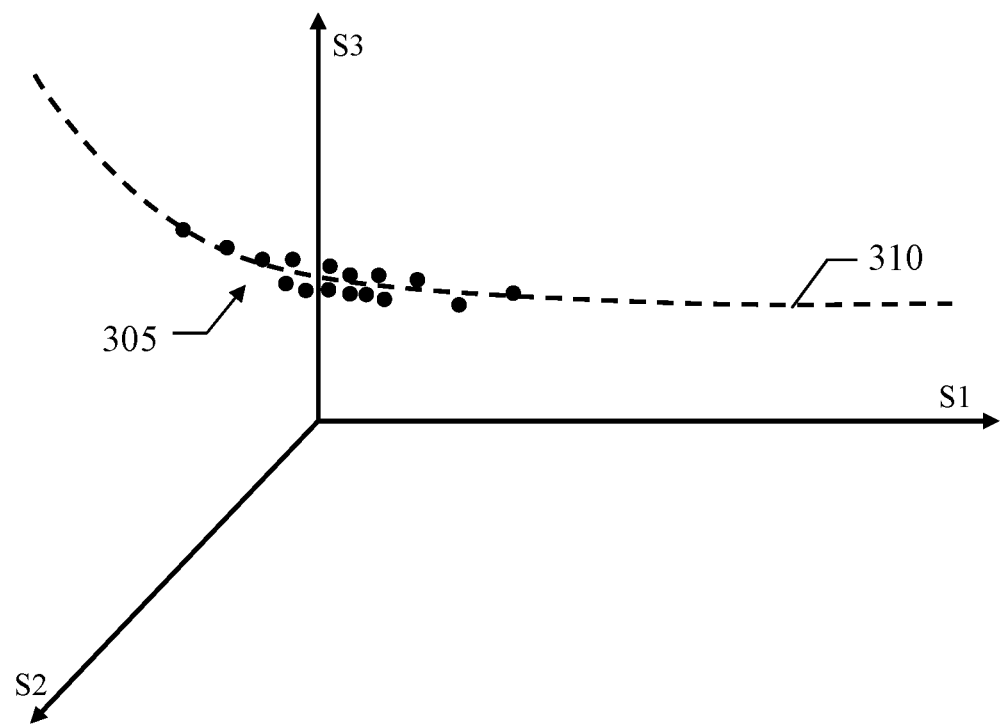
FIG. 3A-FIG. 3B show an example of application according to an embodiment of the present disclosure.
Figure 3B:
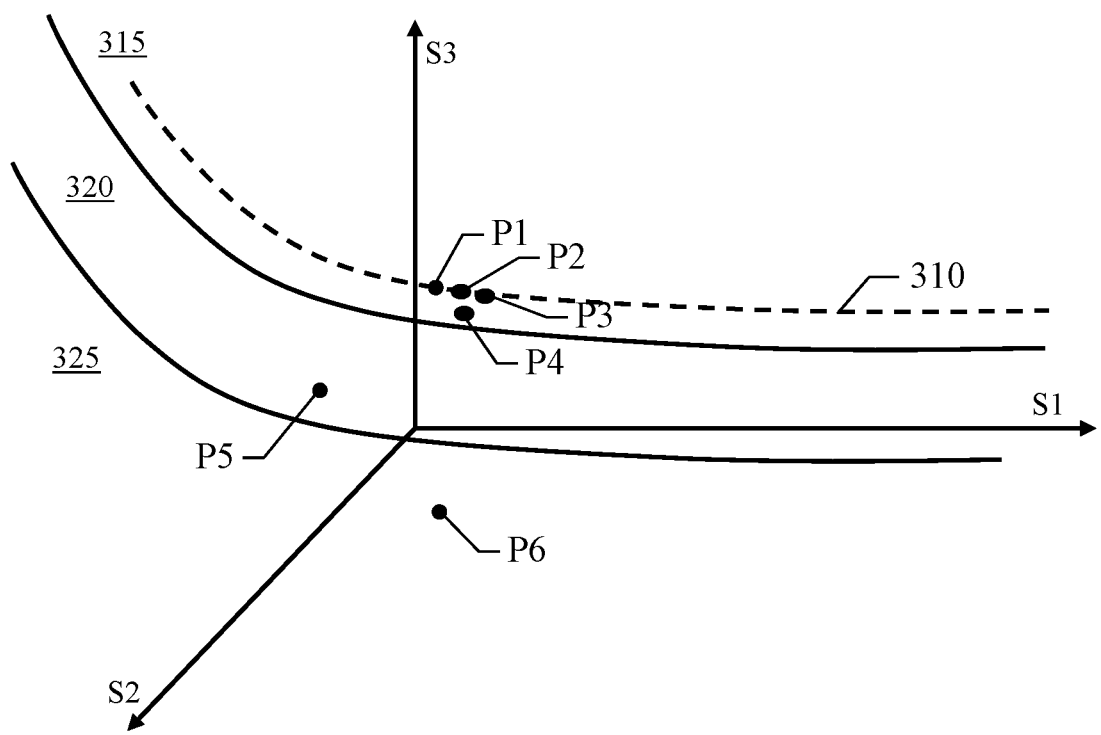

With reference now to FIG. 3A-FIG. 3B, an example is shown of an application of the present disclosure according to an illustrative embodiment.

Starting from FIG. 3A, a very simple scenario is considered wherein the status indicators are only three, denoted with S1, S2 and S3 (for example, S1 for the computing nodes, S2 for the software programs and S3 for the system infrastructures in increasing order of performance). The status indicators S1-S3 are measured repeatedly in a reference condition, wherein the computing system operates normally without the application of any maintenance activity. The (measured) values of the status indicators S1-S3 that have been measured in the reference condition may be represented, in a (3-dimensional) scatter diagram plotting the measured values onto corresponding Cartesian axes, with corresponding (measured) points 305. The measured points 305 are fitted by a reference surface 310, which is then representative of the reference condition of the computing system.

Moving to FIG. 3B, a reference area 315 is defined in the same scatter diagram slightly inside the reference surface 310 and in any case outside it. The reference area 315 then comprises the points (defined by corresponding values of the status indicators S1-S3) wherein the performance of the computing system is as desired (since at most slightly lower than the one in the reference condition). Moreover, a low performance area 320 is defined inside the reference area 315. The low performance area 320 then comprises the points wherein the performance of the computing system is too low (since significantly differing for the worse from the one in the reference condition). In turn, a bad performance area 325 is defined inside the low performance area 320. The bad performance area 325 then comprises the points wherein the performance of the computing system is unacceptably bad (since differing too much for the worse from the one in the reference condition).

The (monitored) values of the status indicators S1-S3 that are monitored during the application of any maintenance activity are represented in the same scatter diagram with corresponding (monitored) points, which are then representative of the current condition of the computing system. The limit number may be updated according to a position of the monitored points with respect to the reference surface 310, and particularly according to their distance from the reference surface 310 as defined by the (reference/low performance/bad performance) areas 315-325, and according to a gradient of the monitored points over time. For example, at a time t1 a monitored point P1 falls within the reference area 315. At a next time t2 a monitored point P2 still falls within the reference area 315 close to the point P1; in this case, the limit number is increased (since it is likely that its highest possible value has not been reached yet, and then the limit number might be increased again without adversely affecting the performance of the computing system). At a next time t3 a monitored point P3 still falls within the reference area 315 close to the point P2; in this case, the limit number is increased again. At a next time t4 a monitored point P4 still falls within the reference area 315 but now significantly away from the monitored point P3 moving inwards; in this case, the limit number is left unchanged (since its highest possible value should have been reached, and a further increase of the limit number is likely to make the performance of the computing system too low). On the other hand, at a generic time t5 a monitored point P5 falls within the low performance area 320; in this case, the limit number is decreased as soon as possible, when the application of the maintenance activity has been completed on one or more computing nodes (since the performance of the computing system is too low). Moreover, at a generic time t6 a monitored point P6 falls within the bad performance area 325; in this case, the limit number is decreased immediately, by rolling-back the application of the maintenance activity on one or more computing nodes (since the performance of the computing system is unacceptably bad).

Figure 4:
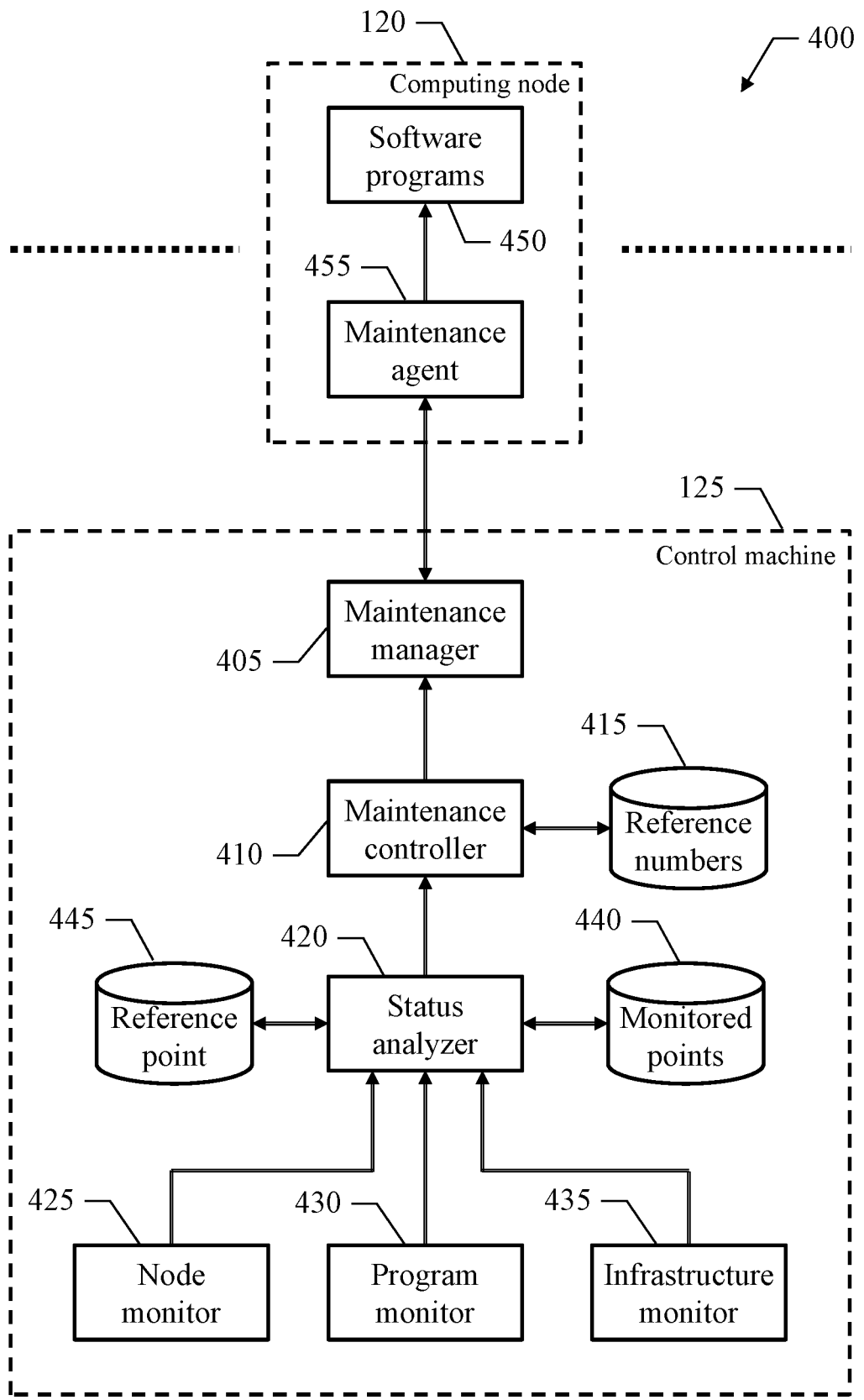
FIG. 4 shows the main software components that can be used according to an embodiment of the present disclosure.

With reference now to FIG. 4, the main software components are shown that may be used according to an embodiment of the present disclosure.

Particularly, all the software components (programs and data) are denoted as a whole with the reference 400. The software components are typically stored in the mass memory and loaded (at least in part) into the working memory of the control machine 125 and the computing nodes 120 when the programs are running, together with a corresponding operating system (not shown in the figure). The programs are initially installed into the mass memory, for example, from removable storage units or from the network. In this respect, each program may be a module, segment or portion of code, which comprises one or more executable instructions for implementing the specified logical function.

Starting from the control machine 125, it comprises the following software components. A maintenance manager 405 manages the maintenance of the computing system of the cloud provider, and particularly of the software programs installed on its computing nodes. For example, the maintenance manager 405 may be based on policies (defining a target state of the software programs) that are to be enforced onto the computing nodes 120. The maintenance manager 405 operates according to one or more configuration parameters; for example, for each maintenance activity the configuration parameters comprise the limit number (of the computing nodes 120 to which the maintenance activity may be applied concurrently at most), a timeout for applying the maintenance activity to each computing node 120, a number of canaries (computing nodes 120 to which the maintenance activity is applied initially before its massive application), a number of retries before declaring the application of the maintenance activity failed on every computing node 120.

In the solution according to an embodiment of the present disclosure, a maintenance controller 410 controls the configuration of the maintenance manager 405, and particularly its limit number. The maintenance controller 410 accesses (in read mode) a reference number file 415; for each maintenance activity that may be applied to the computing system (for example, each one identified by a unique code of the corresponding software program), or for all of them indiscriminately, the reference number file 415 stores a reference number used to initialize the limit number. A status analyzer 420 analyzes the status of the computing system defined by its status indicators. For this purpose, the status analyzer 420 exploits a node monitor 425, a program monitor 430 and an infrastructure monitor 435, which monitor corresponding status indicators of the computing system (for example, by exploiting probes and/or accessing memory structures like registers, logs). Particularly, the node monitor 425 monitors one or more (node) status indicators that are indicative of the status of the computing nodes 120, such as hardware/software resources thereof (for example, available processing power, available working memory, number of restarts, errors). The program monitor 430 monitors one or more (program) status indicators that are indicative of the status of one or more software programs running on the computing nodes 120, such as the software programs implementing the cloud services (for example, consumed processing power, consumed working memory, user tickets, errors). The infrastructure monitor 435 monitors one or more (infrastructure) status indicators that are indicative of the status of one or more system infrastructures of the computing system, such as hardware/software resources that are shared among the computing nodes 120 (for example, network throughput, network traffic, errors). The status analyzer 420 accesses (in read/write mode) a monitored point log 440, which stores one or more monitored points for each maintenance activity that have been collected over time (for example, the last one). The status analyzer 420 accesses (in read/write mode) a reference point file 445, which stores a reference point defined by (reference) values of the status indicators. The reference point is representative (in a simplified form) of the reference condition of the computing system (from which corresponding reference area, low performance area and bad performance area may be defined as above); the use of the reference point reduces the computational complexity of the present disclosure without significantly impacting its accuracy.

Moving to each computing node 120 (only one shown in the figure), it comprises the following software components. One or more software programs 450 are installed on the computing node 120; for example, the software programs 450 comprise an operating system and software applications implementing corresponding cloud services. A maintenance agent 455 applies any required maintenance activity to the software programs 450 (by making them compliant with the relevant policies in the example at issue). For this purpose, the maintenance agent 455 interacts with the maintenance manager 405 of the control machine 125.

Figure 5A:
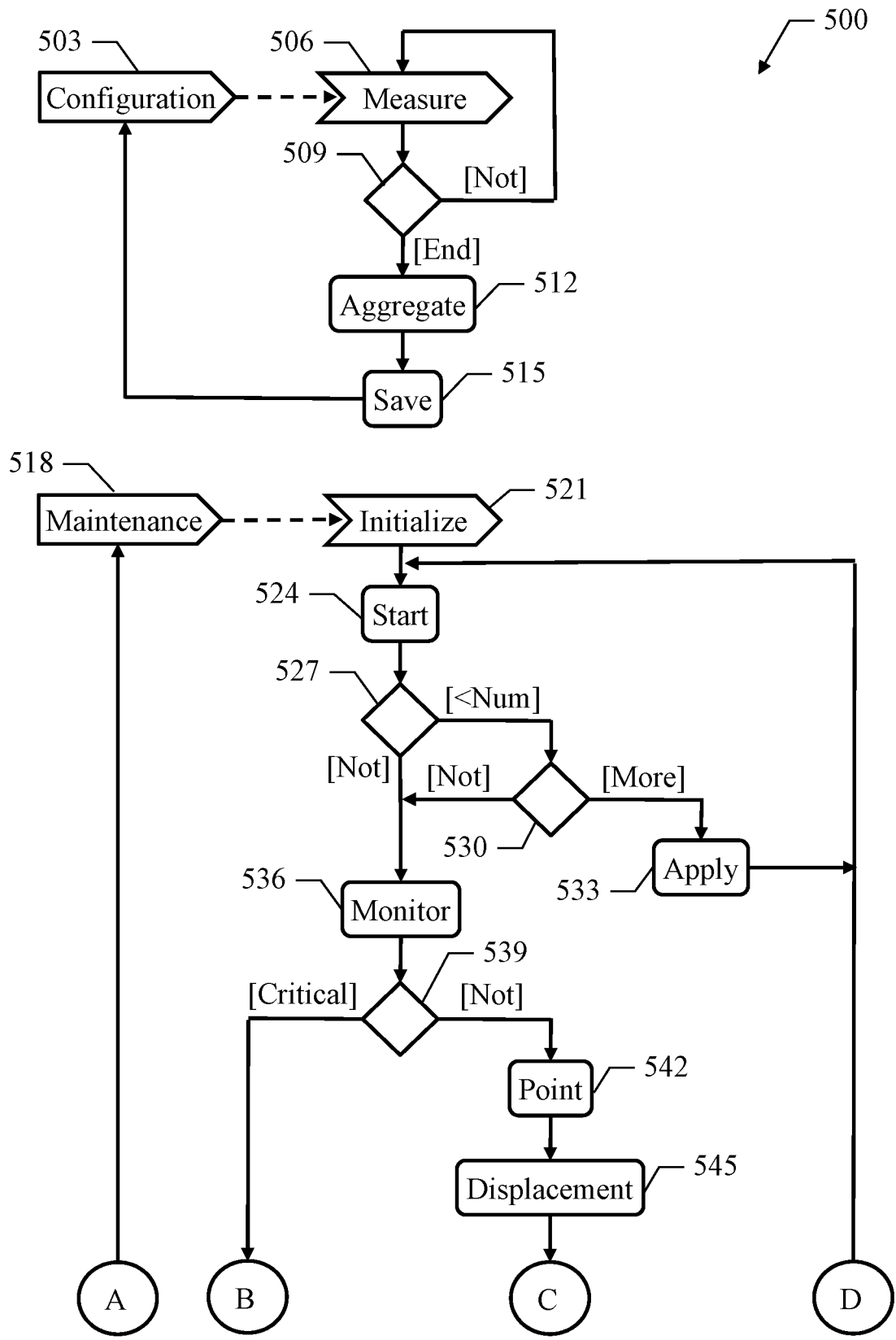
FIG. 5A-FIG. 5B show an activity diagram describing the flow of activities relating to an implementation according to an embodiment of the present disclosure.
Figure 5B:
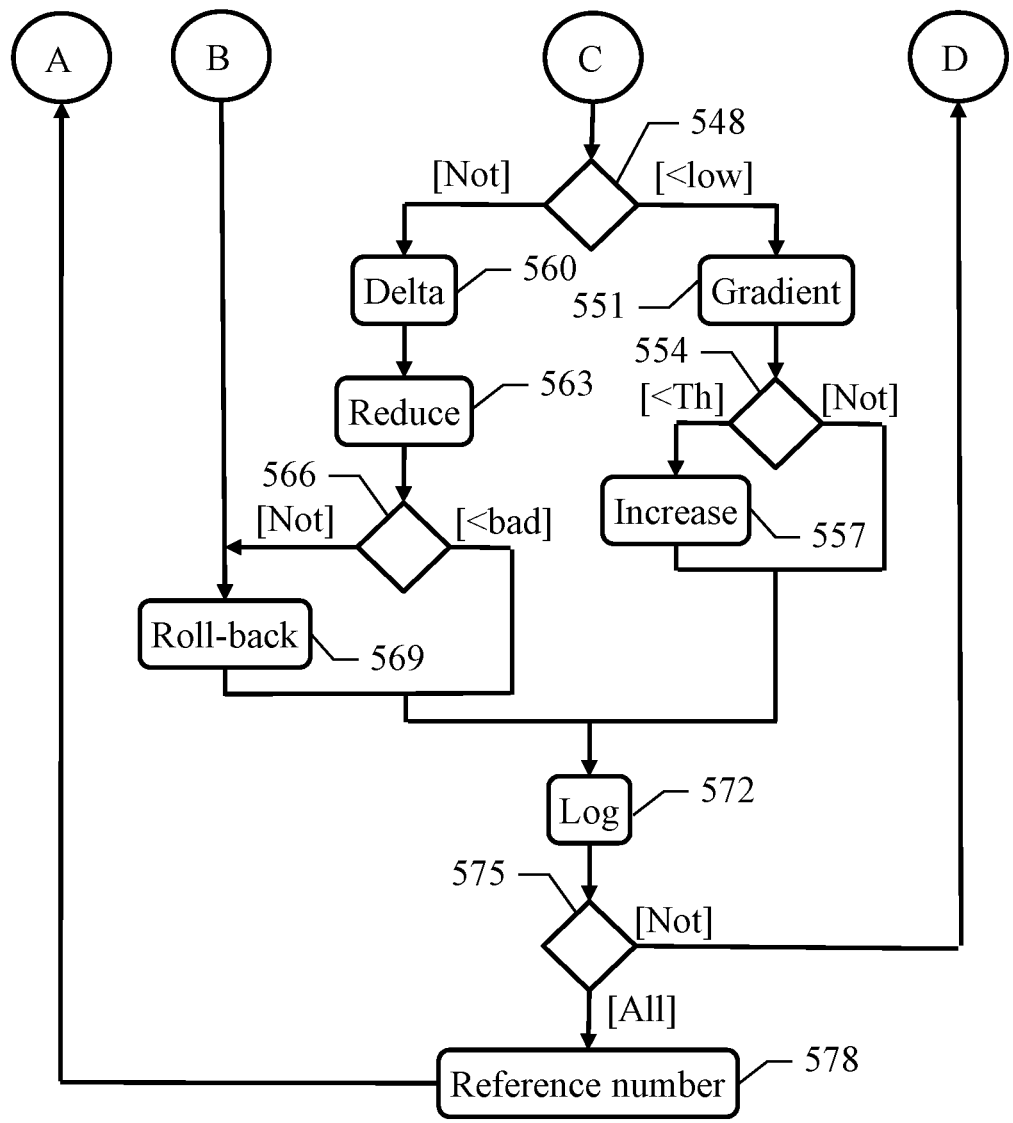

With reference now to FIG. 5A-FIG. 5B, an activity diagram is shown describing the flow of activities relating to an implementation of the present disclosure according to an illustrative embodiment.

Particularly, the activity diagram represents an exemplary process that may be used to maintain the instances of a same software program that are installed on the computing nodes with a method 500. In this respect, each block may correspond to one or more executable instructions for implementing the specified logical function on the control computing machine.

The process passes from block 503 to block 506 in response to a configuration event; for example, this occurs a first time when the software program has been deployed to the computing nodes and possibly later on either automatically (for example, for every significant change of the computing system) or manually (for example, upon request of a system administrator). In any case (once verified that the computing system operates as desired), the status analyzer collects the measured values of the status indicators by requesting the node monitor to measure the node status indicators, the program monitor to measure the program status indicators and the infrastructure monitor to measure the infrastructure status indicators. The status analyzer normalizes the measured values (for example, to range from 0 to 1 for increasing performance of the computing system), so as to obtain the corresponding measured point in an N-dimensional space, with N equal to a number of the status indicators. The flow of activity branches at block 509 according to a number of the measured points that have been collected. If the number of the measured points is (possibly strictly) lower than a (configuration) threshold (required to provide an acceptable degree of accuracy, such as 50-100), the process returns to the block 506 to repeat the same operations. Conversely, once the required number of measured points is available the process descends into block 512, wherein the status analyzer aggregates the measured points into the reference point (for example, by averaging the corresponding measured values). The status analyzer at block 515 saves the reference point into the corresponding file (by replacing its possible previous version). The process then returns to the block 503 waiting for a next configuration event.

In a completely independent way, the process passes from block 518 to block 521 whenever a maintenance request is submitted (for example, by the system administrator or automatically) for performing any maintenance activity on the software program (for example, to change its version/release or to apply a service pack or individual patches). In response thereto, the maintenance controller initializes the limit number to the reference value (retrieved from the corresponding file). The maintenance controller at block 524 then commands the maintenance manager to start applying the maintenance activity onto the computing nodes.

In response thereto, the maintenance manager at block 527 verifies a (progress) number of the computing nodes of the maintenance subset wherein the application of the maintenance activity is in progress (zero at the beginning). If the progress number is (strictly) lower than the limit number, the maintenance manager at block 530 verifies a (remaining) number of the (remaining) computing nodes wherein the maintenance activity is still to be applied. If the remaining number is (strictly) higher than zero, the maintenance manager at block 533 commands the application of the maintenance activity onto a (new) computing node selected in any way among the remaining computing nodes. Particularly, the maintenance manager moves any cloud services implemented on the new computing node to the other (online) computing nodes that are currently online (i.e., wherein the maintenance activity is not in progress) and puts the new computing node offline; the maintenance manager commands the maintenance agent of the new computing node to start the maintenance activity. The application of the maintenance activity then continues independently on each computing node; once the application of the maintenance activity has been completed on any computing node, the maintenance manager returns the corresponding cloud services thereto and puts the computing node online again. The process then returns to the block 524 to repeat the same operations (so as to apply the maintenance activity concurrently to the maintenance subset of the computing nodes with cardinality equal to the limit number as far as possible).

The flow of activity instead descends into block 536 from the block 527 (if the progress number is equal to or higher than the limit number) or from the block 530 (if the remaining number is equal to zero) without performing any action (since the maintenance activity may not be applied to any further computing node at the moment). At this point, the status analyzer collects the monitored values of the status indicators by requesting the node monitor to measure the node status indicators, the program monitor to measure the program status indicators and the infrastructure monitor to measure the infrastructure status indicators. The status analyzer at block 539 verifies whether the measured values indicate any critical condition of the computing system (for example, severe errors or tickets being opened by the users of the cloud services for corresponding complaints).

If not, the status analyzer at block 542 normalizes the monitored values as above, so as to obtain the corresponding monitored point in the same N-dimensional space. The status analyzer at block 545 calculates an inwards displacement along each dimension (i.e., status indicator) of the monitored point from the reference point, equal to the corresponding reference value minus the corresponding monitored value (so as to be positive for decreasing performance of the computing system). The status analyzer at block 548 compares a maximum displacement (equal to the maximum value of the displacements along all the dimensions) with a low performance threshold (for example, 0.1-0.2) defining the reference area with respect to the reference point.

If the maximum displacement is (possibly strictly) lower than the low performance threshold, the monitored point falls within the reference area. Therefore, the status analyzer at block 551 calculate the gradient of the monitored point from its previous version, if any, extracted from the corresponding log (equal to their Euclidean distance in the N-dimensional space). The flow of activity branches at block 554 according to the gradient. If the gradient is (possibly strictly) lower than a (gradient) threshold (for example, 0-0.1), the status analyzer at block 557 increases the limit number by one. Conversely, if the gradient is (possibly strictly) higher than the gradient threshold and in any case at the beginning when no previous version of the monitored point is available in the corresponding log, the process continues without performing any action (so as to leave the limit number unchanged).

Referring back to the block 548, if the maximum displacement is (possibly strictly) higher than the low performance threshold, the monitored point does not fall within the reference area. Therefore, the status analyzer at block 560 determines a delta value for reducing the limit number. For example, the delta value is determined according to the maximum displacement (i.e., 1 from 0.1 to 0.2 excluded, 2 from 0.2 to 0.3 excluded, and so on). The status analyzer at block 563 reduces the limit number by the delta value. The status analyzer at block 566 now compares the maximum displacement with a bad performance threshold (for example, 0.4-0.5) defining the bad performance area with respect to the reference point. If the maximum displacement (higher than the low performance threshold) is (possibly strictly) lower than the bad performance threshold, the monitored point falls within the low performance area defined between the reference area and the bad performance area; in this case, the process continues without performing any action (so as to reduce the cardinality of the maintenance subset as soon as possible when the application of the maintenance activity has been completed on one or more computing nodes, if it is necessary). Referring back to the block 566, if the maximum displacement is instead (possibly strictly) higher than the bad performance threshold, the monitored point falls within the bad performance area. Therefore, the process continues to block 569; the same point is also reached directly form the block 539 if the measured values indicate any critical condition of the computing system. In both cases, the maintenance controller commands the maintenance manager to roll-back the application of the maintenance activity on the computing nodes for bringing the cardinality of the maintenance subset within the (reduced) limit number immediately as far as possible. For this purpose, the maintenance manager at first verifies whether the cardinality of the maintenance subset is (strictly) higher than the limit number. If so, the maintenance manager verifies whether any (candidate) computing nodes are available among the computing nodes of the maintenance subset wherein a time required to roll-back the application of the maintenance activity is shorter than an estimated time required to complete it (by at least a threshold value, such as 0-10%). If so, the maintenance manager commands the maintenance agent of the candidate computing node with the highest value of this estimated time (i.e., wherein the application of the maintenance activity is the less advanced) to roll-back it; as soon as this computing node has been restored, the maintenance manager returns the corresponding cloud services thereto and puts the computing node online. The same operations are repeated until the cardinality of the maintenance subset has been brought within the limit number or no further roll-back of the application of the maintenance activity is possible.

The process merges again at block 572 from the block 554, the block 557, the block 566 or the block 569. At this point, the status analyzer saves the monitored point into the corresponding repository (by replacing its possible previous version). A test is now made at 575, wherein the maintenance controller verifies whether the maintenance activity has been applied to all the computing nodes. If not, the flow of activity returns to the block 524 to repeat the same operations. Conversely (once the maintenance activity has been applied to all the computing nodes), the process descends into block 578, wherein the maintenance controller calculates the reference number (for the application of any next maintenance activity to the same software program) according to the values of the limit number during the application of the maintenance activity (for example, equal to their average); the maintenance controller saves the reference number into the corresponding file (by replacing its previous version, set to a default value at the beginning). The process then returns to the block 518 waiting for a further maintenance request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. On the other hand, each item presented in a group is not to be construed as a de facto equivalent of any other item of the same group solely based on their common presentation without indications to the contrary (but they are individually identified as separate and unique items); likewise, different embodiments, examples or alternatives are not to be construed as a de facto equivalent of one another (but they are separate and autonomous representations of the present disclosure). In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for maintaining a computing system. However, the computing system may be of any type (for example, of cloud or standard type).

In an embodiment, the method is performed under the control a control computing machine. However, the control computing machine may be of any type (see below).

In an embodiment, the computing system comprises a plurality of computing nodes. However, the computing nodes may be in any number and of any type (for example, servers, desktops, laptops, smartphones of either virtual or physical type).

In an embodiment, the computing nodes contribute to operation of the computing system. However, this result may be achieved in any way (for example, in a cluster or grid architecture, with the computing nodes that all perform the same tasks or different portions thereof).

In an embodiment, the method comprises initializing (by the control computing machine) a limit number of the computing nodes. However, the limit number may be initialized in any way (for example, to the reference number based on previous executions of the method, to a fixed default value).

In an embodiment, the method comprises an iteration that is implemented by repeating the following steps until the maintenance activity has been applied to all the computing nodes.

In an embodiment, the iteration comprises causing (by the control computing machine) an application of a maintenance activity. However, the maintenance activity may be of any type (for example, changing version/release, applying service packs or patches, upgrading or downgrading any software program, for example, application program, middleware, operating system, or more generally any other software/hardware resource of the computing system) and it may be applied in any way (for example, with either a localized approach based on policies or a centralized approach).

In an embodiment, the maintenance activity is applied concurrently on a maintenance subset of the computing nodes not exceeding the limit number. However, this result may be achieved in any way (for example, either tolerating or not the exceeding of the limit number up to the completion of the applications of the maintenance activity that are already in progress).

In an embodiment, the iteration comprises monitoring (by the control computing machine) one or more status indicators during the application of the maintenance activity. However, that status indicators may be in any number and of any type (for example, continuous values, discrete values, flags) and they may be monitored in any way (for example, by querying/reading, continually or upon request, in push or pull mode).

In an embodiment, the status indicators are indicative of a status of the computing system. However, the status indicators may be indicative of any status characteristic (for example, performance, stability, power consumption, workload of the computing nodes, the software programs, the system infrastructures or any combination thereof).

In an embodiment, the iteration comprises updating (by the control computing machine) the limit number according to monitored values of the status indicators that have been monitored during the application of the maintenance activity. However, the limit number may be updated in any way (for example, according to any comparison with any reference representation, any trend of the monitored values or any combination thereof, either in a fixed way or according to any linear/non-linear law based thereon).

In an embodiment, said step of monitoring comprises monitoring (by the control computing machine) the status indicators comprising one or more node status indicators that are indicative of a status of the computing nodes. However, the node status indicators may be in any number and of any type (for example, partial, different and additional node status indicators with respect to the ones mentioned above).

In an embodiment, said step of monitoring comprises monitoring (by the control computing machine) the status indicators comprising one or more program status indicators that are indicative of a status of one or more software programs running on the computing nodes. However, the program status indicators may be in any number and of any type (for example, partial, different and additional program status indicators with respect to the ones mentioned above) for any number and type of software programs (for example, the software program under maintenance only or with the addition of any other software programs).

In an embodiment, said step of monitoring comprises monitoring (by the control computing machine) the status indicators comprising one or more infrastructure status indicators that are indicative of a status of one or more system infrastructures of the computing system. However, the infrastructure status indicators may be in any number and of any type (for example, partial, different and additional infrastructure status indicators with respect to the ones mentioned above) for any number and type of system infrastructures (for example, of hardware and/or software type).

In an embodiment, said step of monitoring comprises monitoring (by the control computing machine) the status indicators comprising one or more indications of a critical condition of the computing system. However, the indications of the critical condition may be in any number and of any type (for example, relating to errors, internal/external complaints, breaching of SLAs or any other commitments).

In an embodiment, said step of updating comprises updating (by the control computing machine) the limit number according to a comparison of a monitored point defined by the monitored values with a reference representation of a status of the computing system in a reference condition without the application of the maintenance activity. However, the reference representation may be of any type (for example, a point, a surface, an area) and it may be provided in any way (for example, collected dynamically or pre-set statically); moreover, the monitored point may be compared with the reference representation in any way (for example, according to its distance therefrom, its trend over time or their combination) and this comparison may be used to updated the limit number in any way (for example, increasing/leaving unchanged depending on the trend of the monitored point and reducing the limit number when the monitored point falls into corresponding areas, increasing, leaving unchanged and reducing the limit number when the monitored point falls into corresponding areas independently of its trend).

In an embodiment, the method comprises measuring (by the control computing machine) the status indicators in the reference condition. However, the status indicators may be measured any number of times and in any way (for example, only at the beginning, later on as well either periodically or in response to any automatic/manual event).

In an embodiment, the method comprises defining (by the control computing machine) the reference representation according to measured values of the status indicators that have been measured in the reference condition. However, the reference representation may be defined in any way according to the measured values (for example, with averaging, fitting or any other statistical method).

In an embodiment, said step of updating comprises updating (by the control computing machine) the limit number according to a comparison of the monitored point with a reference point. However, the limit number may be updated according to this comparison in any way (for example, according to the distance of the monitored point from the reference point alone or with the addition of the gradient of the monitored point over time).

In an embodiment, the reference point is defined by corresponding reference values of the reference representation. However, the reference points may be defined in any way (for example, from the measured values by averaging them, from the reference representation analytically).

In an embodiment, said updating comprises updating (by the control computing machine) the limit number according to a distance of the monitored point from the reference representation. However, the distance may be defined in any way (for example, by the displacement only for decreasing performance along each dimension, such as downwards, upwards or their combination, by the Euclidean distance) and it may be used to update the limit number in any way (for example, by increasing, decreasing and/or leaving unchanged it in a discrete or continuous way).

In an embodiment, said updating comprises updating (by the control computing machine) the limit number according to a gradient of the monitored point over time. However, the gradient may be defined in any way (for example, according to the Euclidean distance or the displacement only for decreasing performance, among two or more values of the monitored point) and it may be used to update the limit number in any way (for example, by increasing, decreasing and/or leaving unchanged it in a discrete or continuous way).

In an embodiment, the method comprises, in response to a reduction of the limit number, waiting (by the control computing machine) for a completion of the application of the maintenance activity on one or more of the computing nodes. However, this operation may be performed in any way (for example, either continuing or not monitoring the status indicators for updating the limit number in the meanwhile) and in any condition (for example, only when the distance from the reference representation is within any threshold or always).

In an embodiment, the method comprises, in response to a reduction of the limit number, rolling-back (by the control computing machine) the application of the maintenance activity on one or more of the computing nodes. However, this operation may be performed in any way (for example, either according to the time required to complete the application of the maintenance activity or indiscriminately) and in any condition (for example, only when the distance from the reference representation exceeds any threshold and/or when any critical condition is detected, or always).

In an embodiment, the method comprises saving (by the control computing machine) a reference number based on one or more values of the limit number during the application of the maintenance activity. However, the reference number may be based on any number of values of the limit number in any way (for example, set to their average over the whole application of the maintenance activity or any portion thereof, their lowest value, their last value).

In an embodiment, the method comprises initializing (by the control computing machine) the limit number for a next maintenance activity according to the reference number. However, the limit number may be initialized according to the reference number in any way (for example, equal to the reference number or to a fraction of the reference number, such as according to its age).

In an embodiment, the computing system is of cloud type. However, the cloud may be of any type (for example, PaaS, SaaS and/or NaaS, public, private, community or hybrid).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program configured for causing a control computing machine to perform the above-described method when the computer program is executed on the control computing machine. An embodiment provides a computer program product that comprises a computer readable storage medium having program instructions embodied therewith; the program instructions are executable by a control computing machine to cause the control computing machine to perform the same method.

However, the computer program may be implemented as a stand-alone module, as a plug-in for a pre-existing software program (for example, the maintenance manager of a resource management application), or even directly in the latter. Moreover, the computer program may be executed on any control computing machine (see below).

An embodiment provides a system comprising means that are configured for performing each of the steps of the above-described method. An embodiment provides a system comprising a circuit (i.e., any hardware suitably configured, for example, by software) for performing each of the steps of the same method. However, the system may be of any type (for example, the control computing machine alone, the control computing system with the computing nodes communicating among them via any local, wide area, global, cellular or satellite network and exploiting any type of wired and/or wireless connections); moreover, the control computing machine may be implemented by any physical machine, virtual machine or a static or dynamic combination thereof. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of features described above may be the following: claim 2 with claim 1, claim 3 with claim 1 or 2, claim 4 with any claim from 1 to 3, claim 5 with any claim from 1 to 4, claim 6 with any claim from 1 to 5, claim 7 with claim 6, claim 8 with claim 6 or 7, claim 9 with any claim from 6 to 8, claim 10 with any claim from 6 to 9, claim 11 with any claim from 1 to 10, claim 12 with any claim from 1 to 11, claim 13 with any claim from 1 to 12, claim 14 with instructions for performing the method of any claim from 1 to 13, and claim 15 with means (or a circuitry) for performing each step of any claim from 1 to 13.

What is claimed is:

1. A method for maintaining a physical computing system under the control of a control computing machine, the computing system comprising a plurality of physical computing nodes contributing to operation of the physical computing system, wherein the method comprises:
    initializing by the control computing machine a limit number of the physical computing nodes;
    causing by the control computing machine an application of a maintenance activity concurrently on a maintenance subset of the physical computing nodes not exceeding the limit number,
    monitoring by the control computing machine one or more status indicators during the application of the maintenance activity, the status indicators being indicative of a status of the physical computing system, and
    updating by the control computing machine the limit number according to monitored values of the status indicators being monitored during the application of the maintenance activity,
    repeating the steps of causing, monitoring, and updating, until the maintenance activity has been applied to all of the plurality of physical computing nodes.

2. The method according to claim 1, wherein said monitoring comprises:
    monitoring by the control computing machine the status indicators comprising one or more node status indicators being indicative of a status of the computing nodes.

3. The method according to claim 1, wherein said monitoring comprises:
    monitoring by the control computing machine the status indicators comprising one or more program status indicators being indicative of a status of one or more software programs running on the computing nodes.

4. The method according to claim 1, wherein said monitoring comprises:
    monitoring by the control computing machine the status indicators comprising one or more infrastructure status indicators being indicative of a status of one or more system infrastructures of the computing system.

5. The method according to claim 1, wherein said monitoring comprises:
    monitoring by the control computing machine the status indicators comprising one or more indications of a critical condition of the computing system.

6. The method according to claim 1, wherein said updating comprises:
    updating by the control computing machine the limit number according to a comparison of a monitored point defined by the monitored values with a reference representation of a status of the computing system in a reference condition without the application of the maintenance activity.

7. The method according to claim 6, wherein the method comprises:
    measuring by the control computing machine the status indicators in the reference condition, and
    defining by the control computing machine the reference representation according to measured values of the status indicators being measured in the reference condition.

8. The method according to claim 6, wherein said updating comprises:
    updating by the control computing machine the limit number according to a comparison of the monitored point with a reference point defined by corresponding reference values of the reference representation.

9. The method according to claim 6, wherein said updating comprises:
    updating by the control computing machine the limit number according to a distance of the monitored point from the reference representation.

10. The method according to claim 6, wherein said updating comprises:
    updating by the control computing machine the limit number according to a gradient of the monitored point over time.

11. The method according to claim 1, wherein the method comprises, in response to a reduction of the limit number:
    waiting by the control computing machine for a completion of the application of the maintenance activity on one or more of the computing nodes, and/or
    rolling-back by the control computing machine the application of the maintenance activity on one or more of the computing nodes.

12. The method according to claim 1, wherein the method comprises:
    saving by the control computing machine a reference number based on one or more values of the limit number during the application of the maintenance activity, and initializing by the control computing machine the limit number for a next maintenance activity according to the reference number.

13. The method according to claim 1, wherein the computing system is of cloud type.

14. A computer program product for maintaining a physical computing system comprising a plurality of physical computing nodes contributing to operation of the physical computing system, the computer program product comprising a computer readable storage medium having program instructions embodied therewith, the program instructions executable by a control computing machine to cause the control computing machine to perform a method comprising:
 initializing a limit number of the physical computing nodes;
 causing an application of a maintenance activity concurrently on a maintenance subset of the physical computing nodes not exceeding the limit number,
 monitoring one or more status indicators during the application of the maintenance activity, the status indicators being indicative of a status of the physical computing system, and
 updating the limit number according to monitored values of the status indicators being monitored during the application of the maintenance activity,
 repeating the steps of causing, monitoring, and updating, until the maintenance activity has been applied to all of the plurality of physical computing nodes.

15. The computer program product according to claim 14, wherein said updating comprises:
 updating by the control computing machine the limit number according to a comparison of a monitored point defined by the monitored values with a reference representation of a status of the computing system in a reference condition without the application of the maintenance activity.

16. The computer program product according to claim 15, wherein the method comprises:
 measuring by the control computing machine the status indicators in the reference condition, and
 defining by the control computing machine the reference representation according to measured values of the status indicators being measured in the reference condition.

17. The computer program product according to claim 15, wherein said updating comprises:
 updating by the control computing machine the limit number according to a comparison of the monitored point with a reference point defined by corresponding reference values of the reference representation.

18. The computer program product according to claim 15, wherein said updating comprises:
 updating by the control computing machine the limit number according to a distance of the monitored point from the reference representation.

19. The computer program product according to claim 15, wherein said updating comprises:
 updating by the control computing machine the limit number according to a gradient of the monitored point over time.

20. A control computing machine for maintaining a physical computing system comprising a plurality of physical computing nodes contributing to operation of the physical computing system, wherein the control computing machine comprises:
 a circuitry for initializing a limit number of the physical computing nodes,
 a circuitry for causing an application of a maintenance activity concurrently on a maintenance subset of the physical computing nodes not exceeding the limit number,
 a circuitry for monitoring one or more status indicators during the application of the maintenance activity, the status indicators being indicative of a status of the physical computing system, and
 a circuitry for updating the limit number according to monitored values of the status indicators being monitored during the application of the maintenance activity.

* * * * *